(12) United States Patent
Guo et al.

(10) Patent No.: US 12,713,483 B2
(45) Date of Patent: Aug. 18, 2026

(54) MULTI-LINK OPERATION METHOD, AND APPARATUS THEREOF

(71) Applicant: MEDIATEK INC., Hsinchu City (TW)

(72) Inventors: Ming-Wang Guo, Hsinchu City (TW); Shang-Chun Liu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 286 days.

(21) Appl. No.: 18/396,885

(22) Filed: Dec. 27, 2023

(65) Prior Publication Data

US 2024/0224358 A1 Jul. 4, 2024

Related U.S. Application Data

(60) Provisional application No. 63/489,226, filed on Mar. 9, 2023, provisional application No. 63/477,384, filed on Dec. 28, 2022.

(51) Int. Cl.
*H04W 76/15* (2018.01)

(52) U.S. Cl.
CPC .................................. *H04W 76/15* (2018.02)

(58) Field of Classification Search
CPC .................................................... H04W 76/15
See application file for complete search history.

(56) References Cited

U.S. PATENT DOCUMENTS

2021/0007168 A1* 1/2021 Asterjadhi ........ H04W 52/0235
2023/0144291 A1* 5/2023 Naik ................. H04W 74/0816
370/329
2024/0049084 A1* 2/2024 Mccann ................ H04W 36/08

* cited by examiner

*Primary Examiner* — Myron Wyche
(74) *Attorney, Agent, or Firm* — McClure, Qualey & Rodack, LLP

(57) ABSTRACT

A multi-link operation method is provided. The multi-link operation method may be applied to an apparatus. The multi-link operation method may include the following steps. The apparatus may establish a plurality of links with an access point (AP). Then, the apparatus may transmit a reconfiguration request to the AP to add at least one new link to the plurality of links and/or delete at least one link from the plurality of links. Then, the apparatus may receive a reconfiguration response associated with the reconfiguration request from the AP.

20 Claims, 13 Drawing Sheets

| Value | Meaning | Time priority |
|---|---|---|
| 0 | TID-To-Mapping Request | No |
| 1 | TID-To-Mapping Response | No |
| 2 | TID-To-Mapping Teardown | No |
| 3 | EPCS Priority Access Enable Request | No |
| 4 | EPCS Priority Access Enable Response | No |
| 5 | EPCS Priority Access Enable Teardown | No |
| 6 | EML Operating Mode Notification | No |
| 7 | Link Recommendation | No |
| 8~255 | | |

FIG. 5A

| Value | Meaning | Time priority |
|---|---|---|
| 8 | Non-AP Multiple-Link reconfiguration request (Nego request) | No |
| 9 | Non-AP Multiple-Link reconfiguration reponse (Nego response) | No |

FIG. 5B

| Order | Information |
|---|---|
| 1 | Category |
| 2 | Protected EHT Action |
| 3 | Dialog Token |
| 4 | Multi-Link element |

FIG. 5C

| Order | Information |
|---|---|
| 1 | Category |
| 2 | Protected EHT Action |
| 3 | Dialog Token |
| 4 | Multi-Link element |
| 5 | Key Length and Key Data |

FIG. 5D

| Element ID | Length | Element ID Extension | Multi-link Control | Common Info | Link Info |
|---|---|---|---|---|---|

FIG. 6A

| B0 B2 | B3 | B4 B15 |
|---|---|---|
| Type | Reserved | Presence Bitmap |

FIG. 6B

| Type subfield value | Multi-Link element variant name | Variant specific format |
|---|---|---|
| 0 | Basic | See 9.4.2.312.2 (Basic Multi-Link element) |
| 1 | Probe Request | See 9.4.2.312.3 (Probe Request Multi-Link element) |
| 2 | Reconfiguration | See 9.4.2.312.4 (Reconfiguration Multi-Link element) |
| 3 | TDLS | See 9.4.2.312.5 (TDLS Multi-Link element) |
| 4 | Priority Access | See 9.4.2.312.6 (Priority Access Multi-Link element) |
| 5-7 | Reserved | |

FIG. 6C

| B0 | B1 | B2 | B3 | B4 | B5 | B6 B11 |
|---|---|---|---|---|---|---|
| Link ID Info Present | BSS Parameters Change Count Present | Medium Synchronization Delay Information Present | EML Capabilities Present | MLD Capabilities and Operations Present | AP MLD ID Present | Reserved |

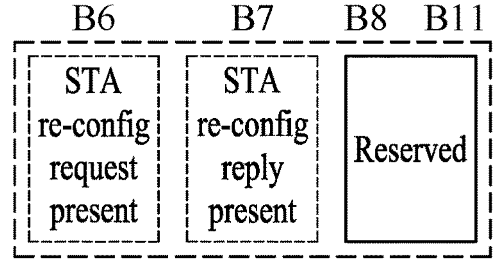

FIG. 6D

| Common Info Length | MLD MAC Address | Link ID Info | BSS Parameters Change Count | Medium Synchronization Delay Information | EML Capabilities | MLD Capabilities and Operations | AP MLD ID | STA re-config request | STA re-config reply |
|---|---|---|---|---|---|---|---|---|---|

FIG. 6E

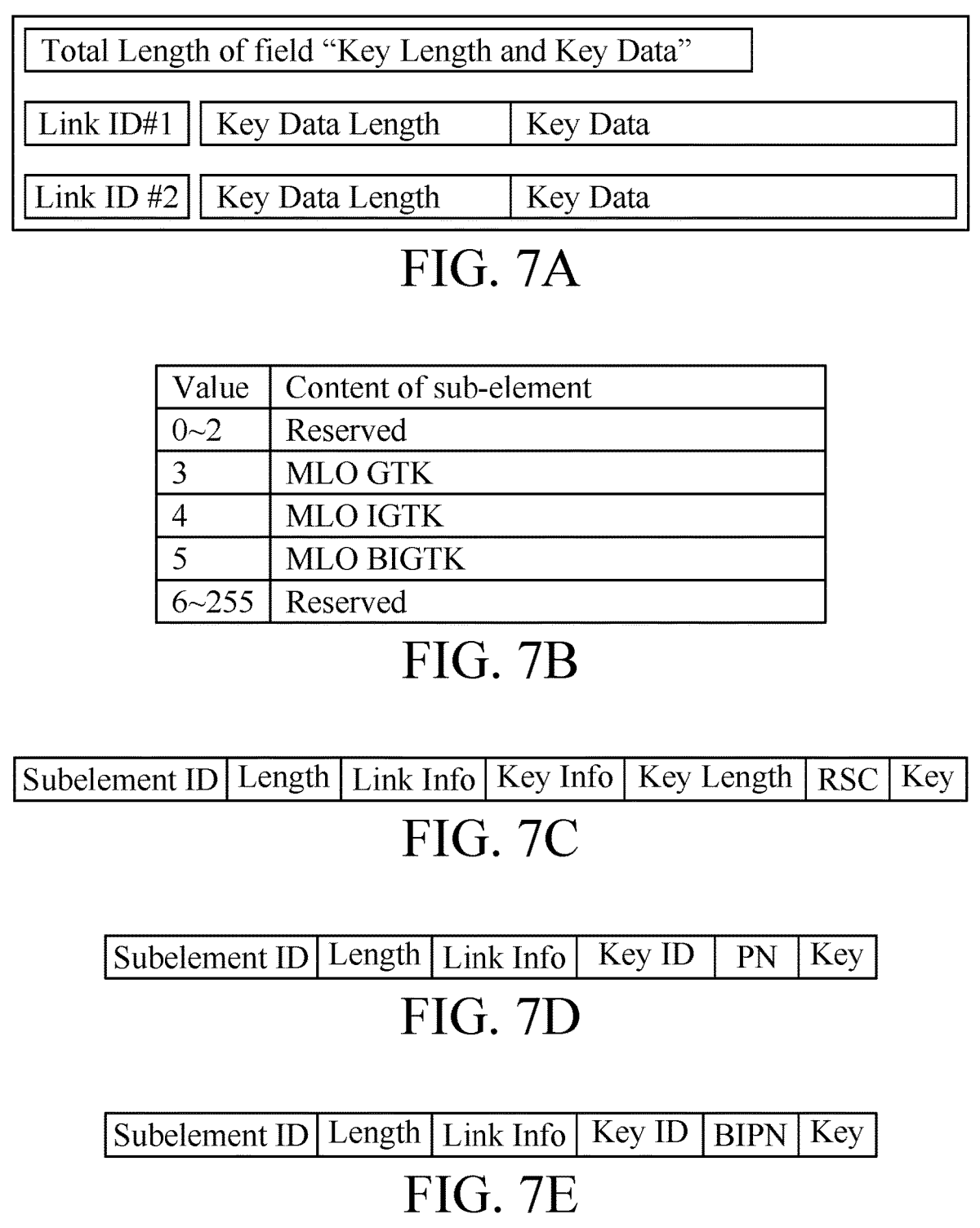

| Total Length of field "Key Length and Key Data" | | |
|---|---|---|
| Link ID#1 | Key Data Length | Key Data |
| Link ID #2 | Key Data Length | Key Data |

FIG. 7A

| Value | Content of sub-element |
|---|---|
| 0~2 | Reserved |
| 3 | MLO GTK |
| 4 | MLO IGTK |
| 5 | MLO BIGTK |
| 6~255 | Reserved |

FIG. 7B

| Subelement ID | Length | Link Info | Key Info | Key Length | RSC | Key |
|---|---|---|---|---|---|---|

FIG. 7C

| Subelement ID | Length | Link Info | Key ID | PN | Key |
|---|---|---|---|---|---|

FIG. 7D

| Subelement ID | Length | Link Info | Key ID | BIPN | Key |
|---|---|---|---|---|---|

FIG. 7E

MULTI-LINK OPERATION METHOD, AND APPARATUS THEREOF

CROSS REFERENCE TO RELATED APPLICATIONS

This application claims the benefits of U.S. Provisional Application No. 63/477,384 filed on Dec. 28, 2022 and U.S. Provisional Application No. 63/489,226 filed on Mar. 9, 2023, the entirety of which is incorporated by reference herein.

BACKGROUND OF THE INVENTION

Field of the Invention

The invention generally relates to wireless communication technology, and more particularly, to a multi-link operation.

Description of the Related Art

As demand for ubiquitous computing and networking has grown, various wireless technologies have been developed, including Wireless-Fidelity (Wi-Fi) which is a Wireless Local Area Network (WLAN) technology allowing mobile devices (such as smartphones, smart pads, laptop computers, portable multimedia players, embedded apparatuses, and the like) to obtain wireless services in a frequency band of 2.4 GHz, 5 GHz, 6 Gz or 60 GHz.

The Institute of Electrical and Electronics Engineers (IEEE) has developed and commercialized various technological standards since the initial WLAN technology is supported using frequencies of 2.4 GHz. For example, IEEE 802.11ac supports Multi-User (MU) transmission using spatial degrees of freedom via a MU-Multiple Input-Multiple-Output (MU-MIMO) scheme in a downlink (DL) direction from an Access Point (AP) to Stations (STAs). To improve performance and meet user's demand for high-capacity and high-rate services, the IEEE 802.11ax has been proposed that uses both Orthogonal Frequency Division Multiple Access (OFDMA) and MU-MIMO in both DL and uplink (UL) directions. In addition to supporting frequency and spatial multiplexing from an AP to multiple STAs, transmissions from multiple STAs to the AP are also supported in IEEE 802.11ax.

In a Wi-Fi multi-link operation (MLO), there exists several links between two Wi-Fi multi-link devices (MLDs), including one access point (AP) MLD and one non-AP MLD (e.g., an STA), that occupy different radio-frequency (RF) bands. One Wi-Fi MLD can perform channel access (e.g., enhanced distributed channel access (EDCA)) on multiple wireless links independently. Specifically, these wireless links can operate independently to increase the overall throughput and to improve connection stability. However, the details of how to add or remove links between the AP MLD and the non-AP MLD through the non-AP MLD are not specified in conventional technologies.

Therefore, how to add or remove links between the AP MLD and the non-AP MLD through the non-AP MLD is a topic that is worthy of discussion.

BRIEF SUMMARY OF THE INVENTION

Multi-link operation methods, an apparatus for multi-link operation, and a network node (such as an access point, AP) for multi-link operation are provided to overcome the problems mentioned above.

An embodiment of the invention provides a multi-link operation method. The multi-link operation method may be applied to an apparatus. The multi-link operation method may include the following steps. The apparatus may establish a plurality of links with an AP. Then, the apparatus may transmit a reconfiguration request to the AP to add at least one new link to the plurality of links and/or delete at least one link from the plurality of links. Then, the apparatus may receive a reconfiguration response associated with the reconfiguration request from the AP.

An embodiment of the invention provides an apparatus for multi-link operation. The apparatus may include a transceiver and a processor. The transceiver may be configured to perform wireless transmission and reception to and from an AP. The processor may be coupled to the transceiver. The processor may be configured to establish a plurality of links with the AP. In addition, the processor may be configured to transmit, via the transceiver, a reconfiguration request to the AP to add at least one new link to the plurality of links and/or delete at least one link from the plurality of links. In addition, the processor may be configured to receive, via the transceiver, a reconfiguration response associated with the reconfiguration request from the AP.

An embodiment of the invention provides a multi-link operation method. The multi-link operation method may be applied to an AP. The multi-link operation method may include the following steps. The AP may establish a plurality of links with a station (STA). Then, the AP may receive a reconfiguration request from the STA to add at least one new link to the plurality of links and/or delete at least one link from the plurality of links. Then, the AP may transmit a reconfiguration response associated with the reconfiguration request to the STA.

An embodiment of the invention provides an AP for multi-link operation method. The apparatus may include a transceiver and a processor. The transceiver may be configured to perform wireless transmission and reception to and from a station (STA). The processor may be coupled to the transceiver. The processor may be configured to establish a plurality of links with the STA. In addition, the processor may be configured to receive, via the transceiver, a reconfiguration request from the STA to add at least one new link to the plurality of links and/or delete at least one link from the plurality of links. In addition, the processor may be configured to transmit, via the transceiver, a reconfiguration response associated with the reconfiguration request to the STA.

Other aspects and features of the invention will become apparent to those with ordinary skill in the art upon review of the following descriptions of specific embodiments of the multi-link operation methods, the apparatus and the AP.

BRIEF DESCRIPTION OF THE DRAWINGS

The invention will become more fully understood by referring to the following detailed description with reference to the accompanying drawings, wherein:

FIG. 5A is a schematic diagram illustrating a protected extremely high throughput (EHT) action fields according to an embodiment of the application.

FIG. 5B is a schematic diagram illustrating the extended protected EHT action values according to an embodiment of the application.

FIG. 5C is a schematic diagram illustrating a non-AP multi-link reconfiguration request format according to an embodiment of the application.

FIG. 5D is a schematic diagram illustrating a non-AP multi-link reconfiguration response format according to an embodiment of the application.

FIG. 6A is a schematic diagram illustrating a multi-link element format according to an embodiment of the application.

FIG. 6B is a schematic diagram illustrating a multi-link control field according to an embodiment of the application.

FIG. 6C is a schematic diagram illustrating a type sub-field according to an embodiment of the application.

FIG. 6D is a schematic diagram illustrating a presence bitmap sub-field according to an embodiment of the application.

FIG. 6E is a schematic diagram illustrating a common info field according to an embodiment of the application.

FIG. 7A is a schematic diagram illustrating a key length and key data format according to an embodiment of the application.

FIG. 7B is a schematic diagram illustrating a key data format according to an embodiment of the application.

FIG. 7C is a schematic diagram illustrating an MLO GTK sub-element format according to an embodiment of the application.

FIG. 7D is a schematic diagram illustrating an MLO IGTK sub-element format according to an embodiment of the application.

FIG. 7E is a schematic diagram illustrating an MLO BIGTK sub-element format according to an embodiment of the application.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
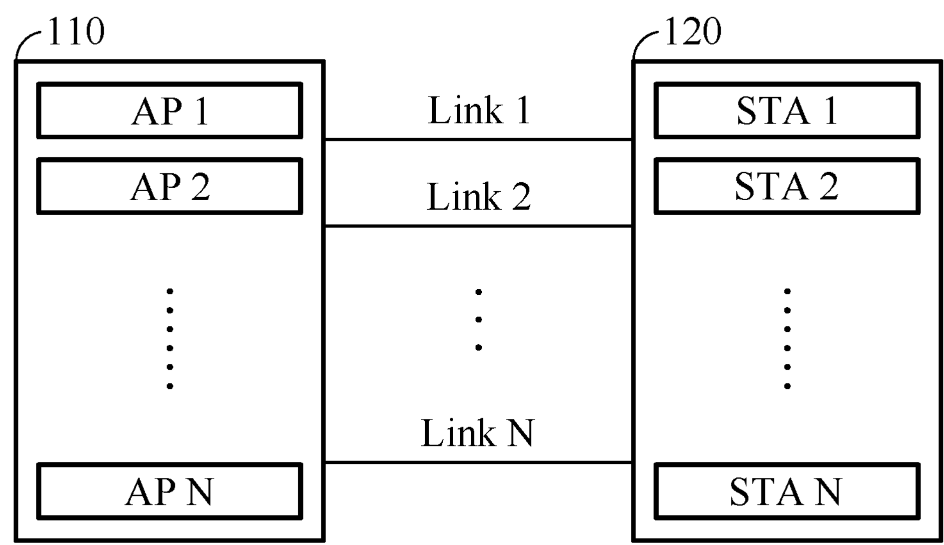
FIG. 1 is a block diagram of a wireless communication system 100 according to an embodiment of the application.

FIG. 1 is a block diagram of a wireless communication system 100 according to an embodiment of the application. As shown in FIG. 1, the wireless communication system 100 may include a network node (take an access point, AP, as an example) 110 and a communication apparatus 120. The AP 110 and the communication apparatus 120 may be the multi-link devices (MLDs), i.e., the AP 110 may be an AP MLD device and the communication apparatus 120 may be a non-AP MLD device. That is, the AP 110 may perform multi-link operation (MLO) with the communication apparatus 120 through multiple wireless links Link 1, Link 2 . . . Link N. Specifically, as shown in FIG. 1, the AP 110 may comprise a plurality of AP modules AP 1, AP 2, . . . , AP N, and the communication apparatus 120 may comprise a plurality of station (STA) modules (or non-AP modules) STA 1, STA 2, . . . , STA N. Each AP module and its corresponding STA module may correspond to a wireless link, e.g., AP 1 and STA 1 may correspond to Link 1. Each wireless link may correspond to a band, e.g., 2.4 GH, 5 GHz, or 6 GHz, but the invention should not be limited thereto. It should be noted that, in order to clarify the concept of the invention, FIG. 1 presents a simplified block diagram in which only the elements relevant to the invention are shown. However, the invention should not be limited to what is shown in FIG. 1.

The AP 110 may be an entity compatible with the Institute of Electrical and Electronics Engineers (IEEE) 802.11 standards to provide and manage the access to the wireless medium for the communication apparatus 120.

According to an embodiment of the invention, the AP 110 may be an Extremely High Throughput (EHT) AP which is compatible with the IEEE 802.11be standards. In another embodiment of the invention, the AP 110 may be an AP which is compatible with any IEEE 802.11 standards later than 802.11be.

According to the embodiments of the invention, the communication apparatus 120 may be may be user equipment (UE), a non-AP station (STA), a mobile phone (e.g., feature phone or smartphone), a panel Personal Computer (PC), a laptop computer, or any computing device, as long as it is compatible with the same IEEE 802.11 standards as the AP 110. The communication apparatus 120 may associate and communicate with the AP 110 to send or receive data in an uplink (UL) or downlink (DL) Multi-User-Physical layer Protocol Data Unit (MU-PPDU). The MU-PPDU may be a resource-unit Orthogonal Frequency Division Multiple Access (RU-OFDMA), a MU-Multiple Input-Multiple-Output (MU-MIMO) PPDU, or an aggregated PPDU.

Figure 2:
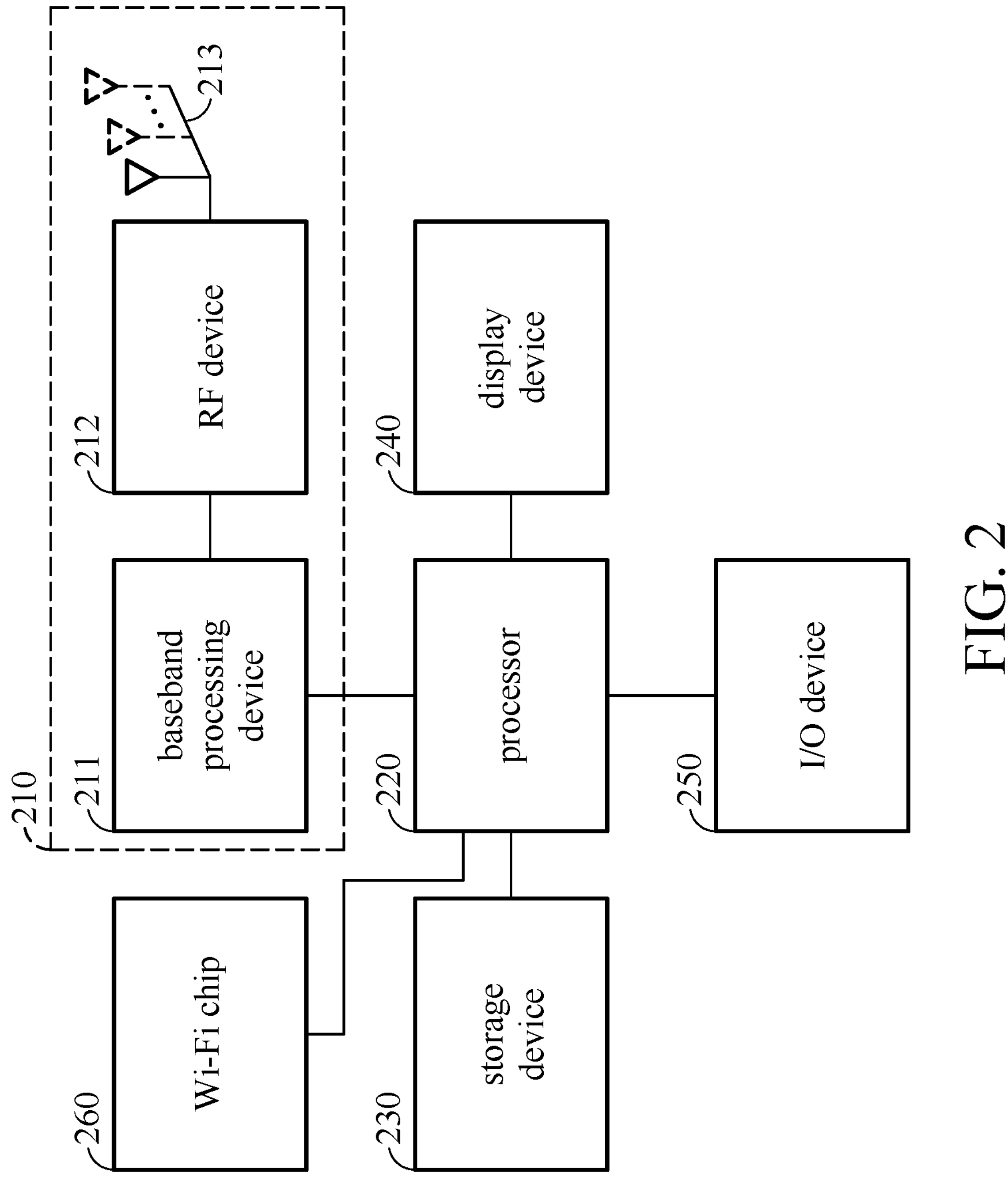
FIG. 2 is a block diagram illustrating a communication apparatus according to an embodiment of the application.

FIG. 2 is a block diagram illustrating a communication apparatus 200 according to an embodiment of the application. The communication apparatus 200 can be applied to the communication apparatus 120. As shown in FIG. 2, the communication apparatus 200 may comprise a wireless transceiver 210, a processor 220, a storage device 230, a display device 240, an Input/Output (I/O) device 250 and a Wi-Fi chip 260.

The wireless transceiver 210 may be configured to perform wireless transmission and reception to and from the communication apparatus 120.

Specifically, the wireless transceiver 210 may include a baseband processing device 211, a Radio Frequency (RF) device 212, and antenna 213, wherein the antenna 213 may include an antenna array for UL/DL MIMO.

The baseband processing device 211 may be configured to perform baseband signal processing, such as Analog-to-Digital Conversion (ADC)/Digital-to-Analog Conversion (DAC), gain adjusting, modulation/demodulation, encoding/decoding, and so on. The baseband processing device 211 may contain multiple hardware components, such as a baseband processor, to perform the baseband signal processing.

The RF device 212 may receive RF wireless signals via the antenna 213, convert the received RF wireless signals to baseband signals, which are processed by the baseband processing device 211, or receive baseband signals from the baseband processing device 211 and convert the received baseband signals to RF wireless signals, which are later transmitted via the antenna 213. The RF device 212 may comprise a plurality of hardware elements to perform radio frequency conversion. For example, the RF device 212 may comprise a power amplifier, a mixer, analog-to-digital converter (ADC)/digital-to-analog converter (DAC), etc.

According to an embodiment of the invention, the RF device 212 and the baseband processing device 211 may collectively be regarded as a radio module capable of communicating with a wireless network to provide wireless communications services in compliance with a predetermined Radio Access Technology (RAT). Note that, in some embodiments of the invention, the communication apparatus 200 may be extended further to comprise more than one antenna and/or more than one radio module, and the invention should not be limited to what is shown in FIG. 2

The processor 220 may be a general-purpose processor, a Central Processing Unit (CPU), a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 210 for wireless communications with the AP 110, storing and retrieving data (e.g., program code) to and from the storage device 230, sending a series of frame data (e.g. representing text messages, graphics, images, etc.) to the display device 240, and receiving user inputs or outputting signals via the I/O device 250.

In particular, the processor 220 coordinates the aforementioned operations of the wireless transceiver 210, the storage device 230, the display device 240, the I/O device 250, and the Wi-Fi chip 260 for performing the method of the present application.

As will be appreciated by persons skilled in the art, the circuits of the processor 220 may include transistors that are configured in such a way as to control the operation of the circuits in accordance with the functions and operations described herein. As will be further appreciated, the specific structure or interconnections of the transistors may be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 230 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, communication protocols, and/or the method of the present application.

The display device 240 may be a Liquid-Crystal Display (LCD), a Light-Emitting Diode (LED) display, an Organic LED (OLED) display, or an Electronic Paper Display (EPD), etc., for providing a display function. Alternatively, the display device 240 may further include one or more touch sensors for sensing touches, contacts, or approximations of objects, such as fingers or styluses.

The I/O device 250 may include one or more buttons, a keyboard, a mouse, a touch pad, a video camera, a microphone, and/or a speaker, etc., to serve as the Man-Machine Interface (MMI) for interaction with users.

According to an embodiment of the invention, the Wi-Fi chip 260 may be configured to perform the operations of Wi-Fi communications. In another embodiment of the invention, the wireless transceiver 210 may be also combined with the Wi-Fi chip 260 to form a Wi-Fi chip.

It should be understood that the components described in the embodiment of FIG. 2 are for illustrative purposes only and are not intended to limit the scope of the application. For example, a communication apparatus may include more components, such as another wireless transceiver for providing telecommunication services, a Global Positioning System (GPS) device for use of some location-based services or applications, and/or a battery for powering the other components of the communication apparatus, etc. Alternatively, a communication apparatus may include fewer components. For example, the communication apparatus 200 may not include the display device 240 and/or the I/O device 250.

Figure 3:
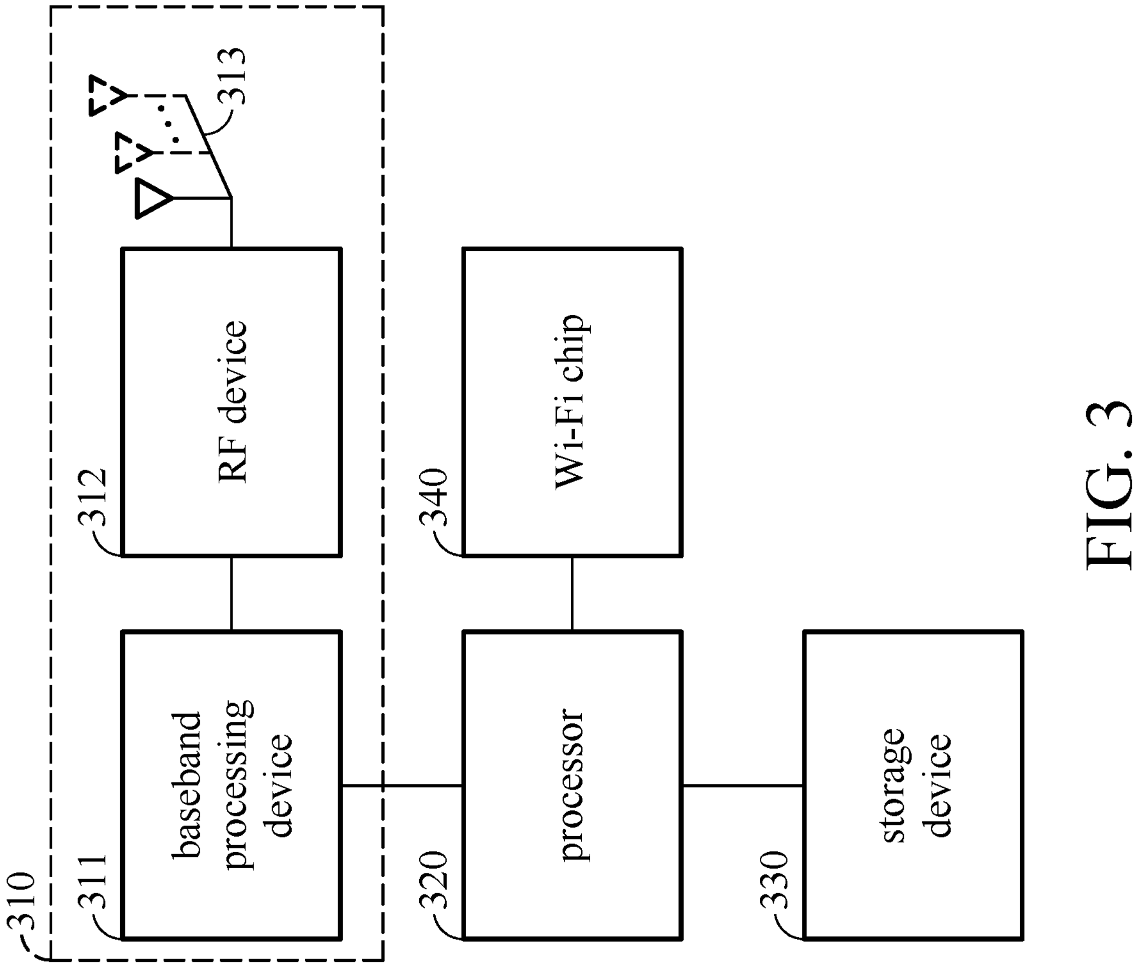
FIG. 3 is a block diagram illustrating an AP according to an embodiment of the application.

FIG. 3 is a block diagram illustrating an AP 300 according to an embodiment of the application. The AP 300 can be applied to the AP 110. As shown in FIG. 3, the AP 300 may comprise a wireless transceiver 310, a processor 320, a storage device 330, and a Wi-Fi chip 340.

The wireless transceiver 310 is configured to perform wireless transmission and reception to and from one or more communication apparatuses (e.g., the communication apparatus 120).

Specifically, the wireless transceiver 310 may include a baseband processing device 311, an RF device 312, and antenna 313, wherein the antenna 313 may include an antenna array for UL/DL MU-MIMO.

The baseband processing device 311 is configured to perform baseband signal processing, such as ADC/DAC, gain adjusting, modulation/demodulation, encoding/decoding, and so on. The baseband processing device 311 may contain multiple hardware components, such as a baseband processor, to perform the baseband signal processing.

The RF device 312 may receive RF wireless signals via the antenna 313, convert the received RF wireless signals to baseband signals, which are processed by the baseband processing device 311, or receive baseband signals from the baseband processing device 311 and convert the received baseband signals to RF wireless signals, which are later transmitted via the antenna 313. The RF device 312 may comprise a plurality of hardware elements to perform radio frequency conversion. For example, the RF device 312 may comprise a power amplifier, a mixer, analog-to-digital converter (ADC)/digital-to-analog converter (DAC), etc.

The processor 320 may be a general-purpose processor, an MCU, an application processor, a DSP, a GPH/HPU/NPU, or the like, which includes various circuits for providing the functions of data processing and computing, controlling the wireless transceiver 310 for wireless communications with the communication apparatus 120, and storing and retrieving data (e.g., program code) to and from the storage device 330.

In particular, the processor 320 coordinates the aforementioned operations of the wireless transceiver 310 and the storage device 330 for performing the method of the present application.

In another embodiment, the processor 320 may be incorporated into the baseband processing device 311, to serve as a baseband processor.

As will be appreciated by persons skilled in the art, the circuits of the processor 320 may include transistors that are configured in such a way as to control the operation of the circuits in accordance with the functions and operations described herein. As will be further appreciated, the specific structure or interconnections of the transistors may be determined by a compiler, such as an RTL compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 330 may be a non-transitory machine-readable storage medium, including a memory, such as a FLASH memory or a NVRAM, or a magnetic storage device, such as a hard disk or a magnetic tape, or an optical disc, or any combination thereof for storing data, instructions, and/or program code of applications, communication protocols, and/or the method of the present application.

According to an embodiment of the invention, the Wi-Fi chip 340 may be configured to perform the operations of Wi-Fi communications. In another embodiment of the invention, the wireless transceiver 310 may be also combined with the Wi-Fi chip 340 to form a Wi-Fi chip.

It should be understood that the components described in the embodiment of FIG. 3 are for illustrative purposes only and are not intended to limit the scope of the application. For example, an AP may include more components, such as a display device for providing a display function, and/or an I/O device for providing an MMI for interaction with users.

According to an embodiment of the invention, the communication apparatus 120 may establish a plurality of links with the AP 110. Then, the communication apparatus 120 may transmit a reconfiguration request to the AP 110 to request to add at least one new link to the established links (i.e., request to enable the STA module corresponding to the new link in the communication apparatus 120 to establish the new link between the STA module and its corresponding AP module of the AP 110) and/or delete at least one link from the established links (i.e., request to disable the STA module corresponding to the link which needs to be deleted in the communication apparatus 120 to remove the link between the STA module and its corresponding AP module of the AP 110). Then, the communication apparatus 120 may receive a reconfiguration response associated with the reconfiguration request from the AP 110. According to the reconfiguration response, the communication apparatus 120 may know whether the AP 110 agrees or disagrees to add at least one new link to the established links and/or delete at least one link from the established links through the reconfiguration response.

Figure 4:
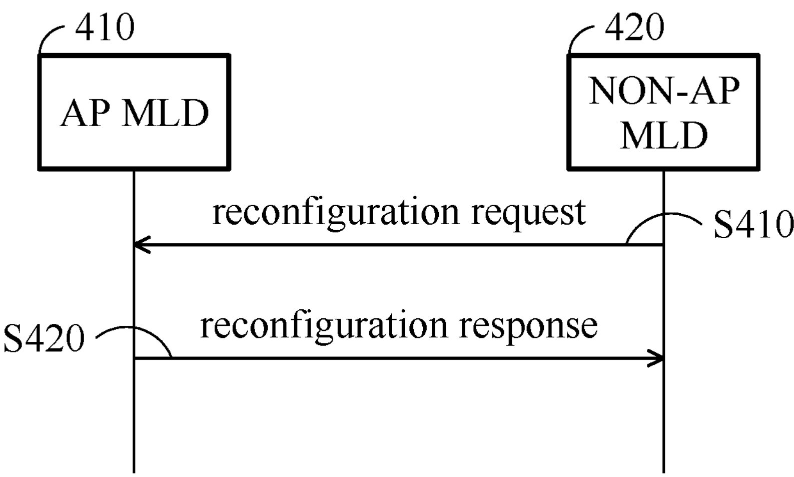
FIG. 4 is a flow chart illustrating a multi-link operation process according to an embodiment of the application.

FIG. 4 is a flow chart illustrating a multi-link operation process according to an embodiment of the application. The multi-link operation process may be applied to the wireless communication system 100. The AP MLD 410 may be applied to the AP 110, and the non-AP MLD 420 may be applied to the communication apparatus 120. As shown in FIG. 4, in step S410, the non-AP MLD 420 may transmit a reconfiguration request (e.g., a non-AP multi-link reconfiguration request or a negotiation (Nego) request) to the AP MLD 410 to request to add at least one new link to the links that have been established between the AP MLD 410 and the non-AP MLD 420 (i.e., request to enable the STA module corresponding to the new link in the non-AP MLD 420 to establish the new link between the STA module and its corresponding AP module of the AP MLD 410) and/or delete at least one link from the links has been established between the AP MLD 410 and the non-AP MLD 420 (i.e., request to disable the STA module corresponding to the link which needs to be deleted in the non-AP MLD 420 to remove the link between the STA module and its corresponding AP module of the AP MLD 410).

In step S420, the AP MLD 410 may transmit a reconfiguration request (e.g., a non-AP multi-link reconfiguration response or a negotiation (Nego) response) to the non-AP MLD 420 to respond the reconfiguration request from the non-AP MLD 420. Specifically, according to information of the reconfiguration request, the AP MLD 420 may determine to agree or disagree to add at least one new link to the links that have been established between the AP MLD 410 and the non-AP MLD 420 and/or delete at least one link from the links has been established between the AP MLD 410 and the non-AP MLD 420. Then, the AP MLD 410 may transmit the reconfiguration response to the non-AP MLD 420.

According to an embodiment of the invention, the reconfiguration request may comprise information of the new link (or new links) and information of the link (or links) needs to be deleted.

According to an embodiment of the invention, the reconfiguration response may indicate that the AP 110 agrees to add the new link (or new links) to the established links and/or delete the link (or links) from the established links, or indicate that the AP 110 does not agree to add the new link (or new links) to the established links and/or delete the link (or links) from the established links. In an example, when the AP 110 agrees to add the new link (or new links) to the established links, the reconfiguration response may further comprise key information for the new link (or new links).

According to an embodiment of the invention, the reconfiguration request and the reconfiguration response may be carried through the protected extremely high throughput (EHT) action frame, but the invention should not be limited thereto. That is, the communication apparatus 120 may transmit the reconfiguration request to the AP 110 through a protect EHT action frame, and the AP 110 may transmit the reconfiguration response to the communication apparatus 120 through a protect EHT action frame. The information of the reconfiguration request and the reconfiguration response may be carried in the fields of the protect EHT action frame. FIGS. 5A-5D, FIGS. 6A-6E and FIGS. 7A-7E may be taken as an example to illustrate the information of the reconfiguration request and the reconfiguration response may be carried in the fields of the protect EHT action frame, but the invention should not be limited thereto. The information of the reconfiguration request and the reconfiguration response may also be able to be carried in other suitable frame.

FIG. 5A is a schematic diagram illustrating a protected extremely high throughput (EHT) action fields according to an embodiment of the application. As shown in FIG. 5A, the reconfiguration request and the reconfiguration response may be recorded in two fields of the reserved fields (e.g., fields 8~255) in the protected EHT action frame, but the invention should not be limited thereto.

FIG. 5B is a schematic diagram illustrating the extended protected EHT action values according to an embodiment of the application. As shown in FIG. 5B, the reconfiguration request (e.g., non-AP multi-link reconfiguration request (Nego request)) may be recorded in the field 8 of the protected EHT action frame, and the reconfiguration response (e.g., non-AP multi-link reconfiguration response (Nego response)) may be recorded in the field 9 of the protected EHT action frame, but the invention should not be limited thereto.

FIG. 5C is a schematic diagram illustrating a non-AP multi-link reconfiguration request format according to an embodiment of the application. As shown in FIG. 5C, the non-AP multi-link reconfiguration request format corresponding to the reconfiguration request recorded in the field 8 of the protected EHT action frame may comprise a category, a protected EHT action, a dialog Token and a multi-link element.

FIG. 5D is a schematic diagram illustrating a non-AP multi-link reconfiguration response format according to an embodiment of the application. As shown in FIG. 5D, the non-AP multi-link reconfiguration response format corresponding to the reconfiguration response recorded in the field 9 of the protected EHT action frame may comprise a category, a protected EHT action, a dialog Token, a multi-link element and a key length and key data.

FIG. 6A is a schematic diagram illustrating a multi-link element format according to an embodiment of the application. As shown in FIG. 6A, the format of the multi-link element corresponding to the non-AP multi-link reconfiguration request format as shown in FIG. 5C and the non-AP multi-link reconfiguration response format as shown in FIG. 5D may comprise an element ID field, a length field, an element ID extension field, a multi-link control field, a common information field, and a link information field.

FIG. 6B is a schematic diagram illustrating a multi-link control field according to an embodiment of the application. As shown in FIG. 6B, the multi-link control field of the multi-link element format may comprise a type sub-field which may occupy bit B0-bit B2 of the multi-link control field, a reserved sub-field which may occupy bit B3-bit B4 of the multi-link control field and a presence bitmap sub-field which may occupy bit B4-bit B15 of the multi-link control field.

FIG. 6C is a schematic diagram illustrating a type sub-field according to an embodiment of the application. As shown in FIG. 6C, the information of the type sub-field of the multi-link control field of the multi-link element format may be shown in FIG. 6C.

FIG. 6D is a schematic diagram illustrating a presence bitmap sub-field according to an embodiment of the application. As shown in 6D, the information corresponding to the reconfiguration request and the reconfiguration response may be recorded in the reserved bits (e.g., bit B6-bit B11) of the presence bitmap sub-field of the multi-link control field of the multi-link element format. As shown in FIG. 6D, the bit B6 of the presence bitmap sub-field may be used to record information corresponding to the reconfiguration request, and the bit B7 of the presence bitmap sub-field may be used to record information corresponding to the reconfiguration response. The bit B6 may be referred to as the STA re-config request presence, and the bit B7 may be referred to as the STA re-config reply presence.

In an example, when the value of bit B6 is "1", it means that the fields of the multi-link element format may comprise information corresponding to the reconfiguration request. In addition, when the value of bit B7 is "1", it means that the fields of the multi-link element format may comprise information corresponding to the reconfiguration response. It should be noted that the examples are only used to illustrate the embodiments of the invention, but the invention should not be limited thereto. In addition, according an embodiment, the fields of the multi-link element format comprising the information corresponding to the reconfiguration request may only carried by the non-AP MLD, and the fields of the multi-link element format comprising the information corresponding to the reconfiguration response may only carried by the AP MLD.

FIG. 6E is a schematic diagram illustrating a common info field according to an embodiment of the application. As shown in 6E, the common information (Info) field of the multi-link element format may comprise a STA re-config request sub-field and a STA re-config reply sub-filed. The STA re-config request sub-field may be associated with the bit B6 (STA re-config request presence) shown in FIG. 6D, and the STA re-config reply sub-filed may be associated with the bit B7 (STA re-config reply presence) shown in FIG. 6D.

In an embodiment, the STA re-config request sub-field may be recorded by 4 octets, where two octets may be used for adding the links, and the other two bits may be used for deleting links. For example, if the value bit #1 of the octets used for adding the links is "1", it may mean that the non-AP MLD requests to add the link with link ID #1, and if the value bit #2 of the octets used for deleting the links is "1", it may mean that the non-AP MLD requests to delete the link with link ID #2, but the invention should not be limited thereto.

In addition, in an embodiment, the STA re-config reply sub-field may be also recorded by 4 octets, where two octets may be used for agreeing or disagreeing to add the links, and the other two bits may be used for agreeing or disagreeing to delete links. For example, if the value bit #1 of the octets used for adding the links is "1", it may mean that the AP MLD agrees to add the link with link ID #1, and if the value bit #2 of the octets used for deleting the links is "1", it may mean that the AP MLD agrees to delete the link with link ID #2, but the invention should not be limited thereto.

FIG. 7A is a schematic diagram illustrating a key length and key data format according to an embodiment of the application. As shown in FIG. 7A, the format of the key length and key data corresponding to the non-AP multi-link reconfiguration response format as shown in FIG. 5D may comprise a total length field, link ID fields, key data length fields, and the key data fields, where each link ID field may corresponding to a one key data length field and one key data field. For example, link ID field associated with link ID #1 may correspond to the key data length field associated with link ID #1 and the key data field associated with link ID #1. The information of the link ID fields, key data length fields, and the key data fields of the key length and key data format may be used to add and/or delete different links.

FIG. 7B is a schematic diagram illustrating a key data format according to an embodiment of the application. As shown in FIG. 7B, each key data field may associated with different sub-elements (e.g., an MLO group temporary key (GTK) sub-element, an MLO integrity GTK (IGTK) sub-element, and an MLO beacon IGTK sub-element) for different purposes. Different sub-element may correspond to different values as recorded in FIG. 7B.

FIG. 7C is a schematic diagram illustrating an MLO GTK sub-element format according to an embodiment of the application. As shown FIG. 7C, the format of the MLO GTK sub-element may comprise a sub-element ID field, a length field, a link information (Info) field, a key information field, a key length field, a received sequence counter (RSC) field, and a key field.

FIG. 7D is a schematic diagram illustrating an MLO IGTK sub-element format according to an embodiment of the application. As shown FIG. 7D, the format of the MLO IGTK sub-element may comprise a sub-element ID field, a length field, a link information field, a key ID field, a packet number (PN) field, and a key field.

FIG. 7E is a schematic diagram illustrating an MLO BIGTK sub-element format according to an embodiment of the application. As shown FIG. 7E, the format of the MLO BIGTK sub-element may comprise a sub-element ID field, a link length field, a link information field, a key ID field, a BIGTK packet number (BIPN) field, and a key field.

Figure 8:
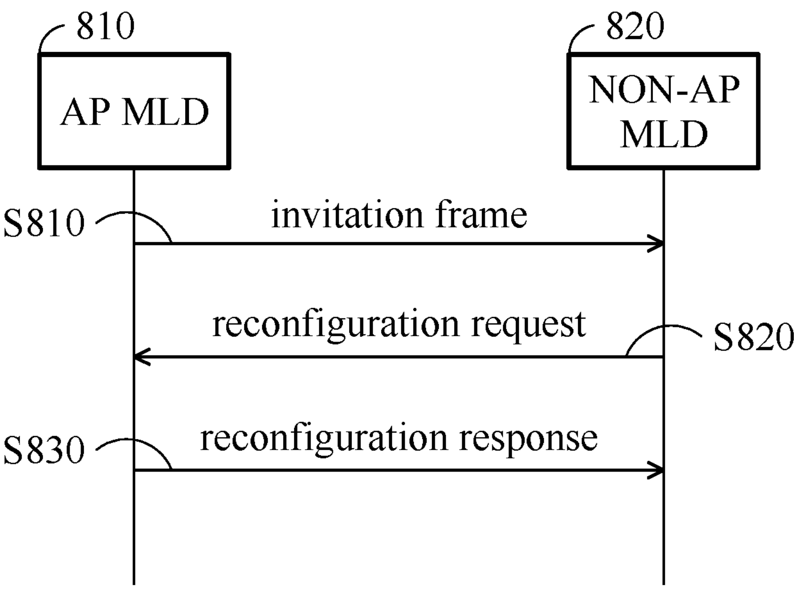
FIG. 8 is a flow chart illustrating a multi-link operation process according to another embodiment of the application.

FIG. 8 is a flow chart illustrating a multi-link operation process according to another embodiment of the application. The multi-link operation process may be applied to the wireless communication system 100. The AP MLD 810 may be applied to the AP 110, and the non-AP MLD 820 may be applied to the communication apparatus 120. As shown in FIG. 8, in step S810, the AP MLD 810 may transmit an invitation frame to the non-AP MLD 820 to suggest that the non-AP MLD 820 reset its links (or STA modules) connected to the AP MLD 810. Specifically, the AP MLD 810 may determine whether any link (or STA module) of the non-AP MLD 820 is in the low traffic mode or in the power saving (PS) mode, and determine whether any link (or STA module) of the non-AP MLD 820 is in the high traffic mode. If there is at least one link (or STA module) of the non-AP MLD 820 that is in the low traffic mode or in the power saving (PS) mode, and/or there is at least one link (or STA module) of the non-AP MLD 820 that is in the high traffic mode, the AP MLD 810 may transmit the invitation frame to the non-AP MLD 820 to suggest that the non-AP MLD 820 reset its links (or STA modules) connected to the AP MLD 810. The details of the invitation frame transmission will be illustrated below by referring to FIG. 9 and FIG. 10.

After the non-AP MLD 820 receives the invitation frame from the AP MLD 810, the non-AP MLD 820 may determine whether to reset or adjust its links (or STA modules) connected to the AP MLD 810 based on the invitation frame. When the non-AP MLD 820 determines to reset or adjust its links (or STA modules) connected to the AP MLD 810, step S820 (similar to step S410 of FIG. 4) is performed. In step S820, the non-AP MLD 820 may transmit a reconfiguration request (e.g., a non-AP multi-link reconfiguration request or a negotiation (Nego) request) to the AP MLD 810 to request to add at least one new link to the links that have been established between the AP MLD 810 and the non-AP MLD 820 (i.e., request to enable the STA module corresponding to the new link in the non-AP MLD 820 to establish the new link between the STA module and its corresponding AP module of the AP MLD 810) and/or delete at least one link from the links has been established between the AP MLD 810 and the non-AP MLD 820 (i.e., request to disable the STA module corresponding to the link which needs to be deleted in the non-AP MLD 820 to remove the link between the STA module and its corresponding AP module of the AP MLD 810).

In step S830 (similar to step S420 of FIG. 4), the AP MLD 810 may transmit a reconfiguration request (e.g., a non-AP multi-link reconfiguration response or a negotiation (Nego) response) to the non-AP MLD 820 to respond the reconfiguration request from the non-AP MLD 820. Specifically, according to information of the reconfiguration request, the AP MLD 820 may determine to agree or disagree to add at least one new link to the links that have been established between the AP MLD 810 and the non-AP MLD 820 and/or delete at least one link from the links has been established between the AP MLD 810 and the non-AP MLD 820. Then, the AP MLD 810 may transmit the reconfiguration response to the non-AP MLD 820.

Figure 9:
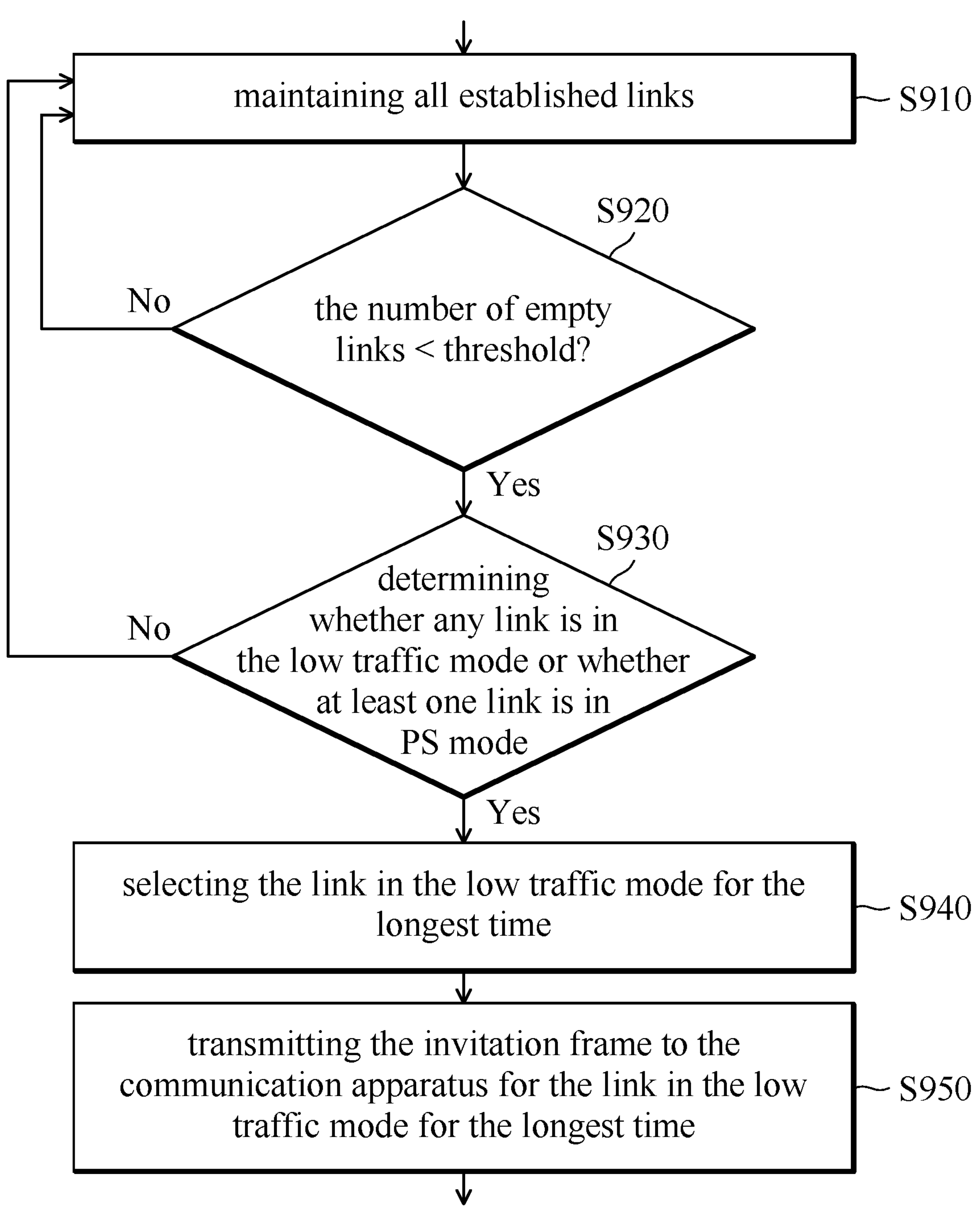
FIG. 9 is a flow chart illustrating an invitation frame transmission according to an embodiment of the application.

FIG. 9 is a flow chart illustrating an invitation frame transmission according to an embodiment of the application. The multi-link operation process may be applied to the wireless communication system 100. As shown in FIG. 9, in step S910, the AP 110 may maintain all established links with the communication apparatus 120.

In step S920, the AP 110 may determine whether the number of the empty links is smaller than a threshold. The empty links may mean the current available links to accept the communication apparatus 120 to setup new links, or the links which have not been established between the AP 110 and the communication apparatus 120). If the number of the empty links is not smaller than the threshold, the method may return to step S910.

If the number of the empty links is smaller than the threshold, step S930 is performed. In step S930, the AP 110 may determine whether any established link is in the low traffic mode or whether at least one established link is in PS mode. If there is no established link in the low traffic mode and there is no established link in PS mode, the method may return to step S910.

If there is at least one established link in the low traffic mode and/or there is at least one established link in PS mode, step S940 is performed. In step S940, the AP 110 may select the established link that has been in the low traffic mode for the longest time, i.e., the link has been in the low traffic mode for a very long time.

Is step S950, the AP 110 may transmit the invitation frame to the communication apparatus 120 to suggest that the communication apparatus 120 delete (or remove) the link that has been in the low traffic mode for the longest time.

Figure 10:
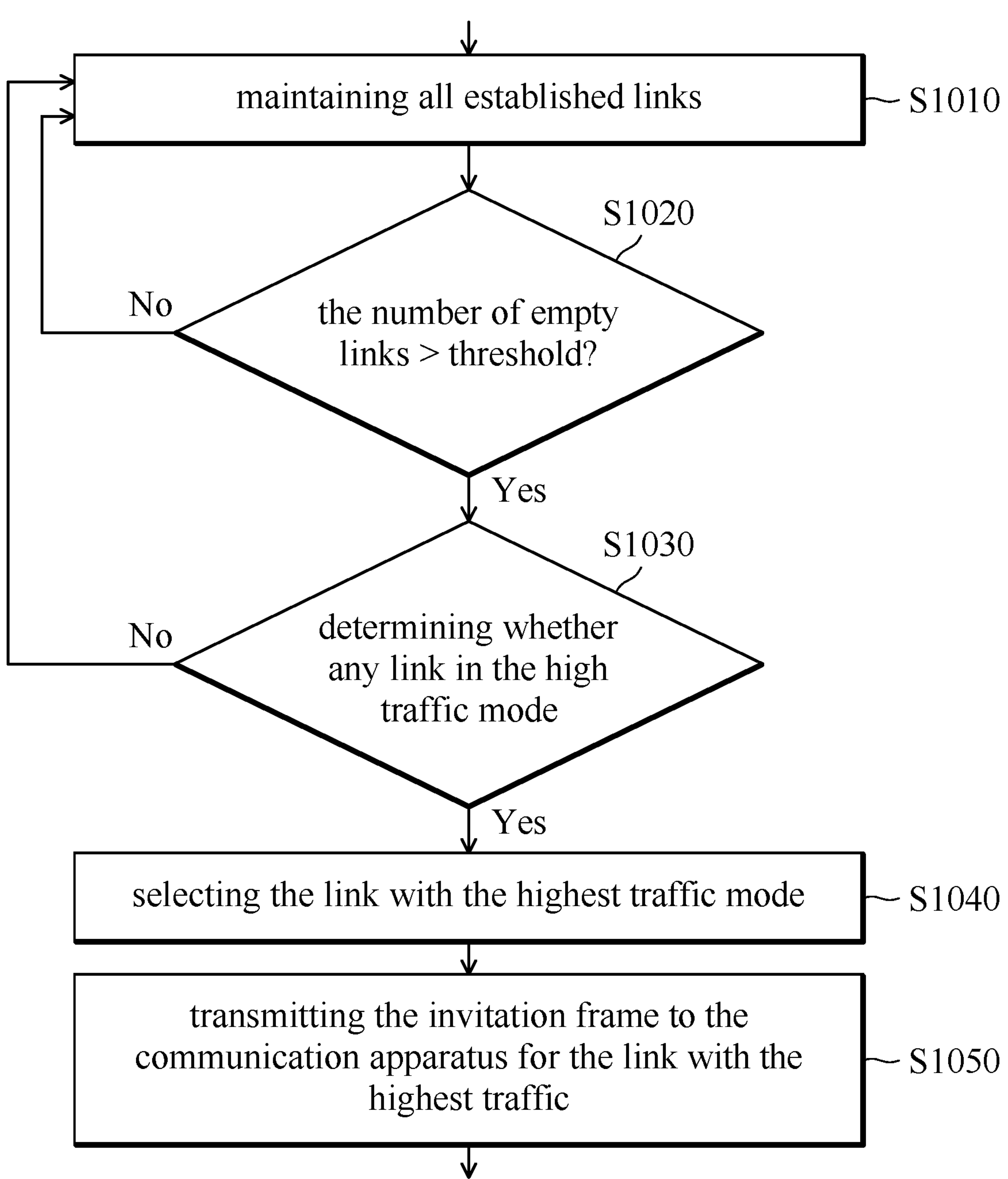
FIG. 10 is a flow chart illustrating an invitation frame transmission according to another embodiment of the application.

FIG. 10 is a flow chart illustrating an invitation frame transmission according to another embodiment of the application. The multi-link operation process may be applied to the wireless communication system 100. In step 1010, the AP 110 may maintain all established links with the communication apparatus 120.

In step S1020, the AP 110 may determine whether the number of the empty links is greater than a threshold. The empty links may mean the current available links to accept the communication apparatus 120 to setup new links, or the links which have not been established between the AP 110 and the communication apparatus 120). If the number of the empty links is not greater than the threshold, the method may return to step S1010. It should be noted that the threshold illustrated in step S1020 may be different from the threshold illustrated in step S920. The two thresholds may respectively have different settings for different system requirements.

If the number of the empty links is greater than the threshold, step S1030 is performed. In step S1030, the AP 110 may determine whether any established link is in the high traffic mode. If there is no established link in the high traffic mode, the method may return to step S1010.

If there is at least one established link in the high traffic mode, step S1040 is performed. In step S1040, the AP 110 may select the established link with the highest traffic, the service in link may need more link for transmission.

Is step S1050, the AP 110 may transmit the invitation frame to the communication apparatus 120 to suggest that the communication apparatus 120 add at least one empty link for the link with the highest traffic.

Figure 11:
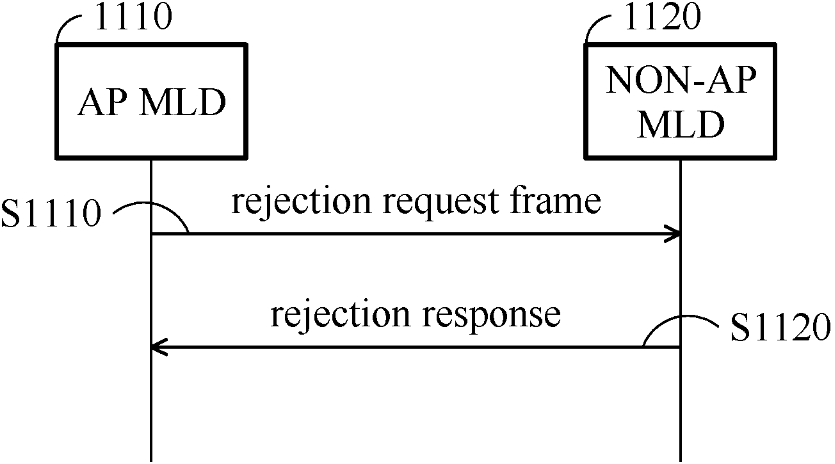
FIG. 11 is a flow chart illustrating a multi-link operation process according to another embodiment of the application.

FIG. 11 is a flow chart illustrating a multi-link operation process according to another embodiment of the application. The multi-link operation process may be applied to the wireless communication system 100. The multi-link operation process may be applied to the wireless communication system 100. The AP MLD 1110 may be applied to the AP 110, and the non-AP MLD 1120 may be applied to the communication apparatus 120. As shown in FIG. 11, in step S1110, the AP MLD 1110 may transmit a rejection request frame to the non-AP MLD 1120 to ask to delete at least one link from the established links between the AP MLD 1110 and the non-AP MLD 1120.

In step S1120, the non-AP MLD may transmit a rejection response with a agree status to agree to delete the asked link from the established links, or transmit a rejection response with a disagree status to disagree to delete the asked link from the established links. In an embodiment of the invention, when the non-AP MLD may transmit the rejection response with the agree status to the AP MLD, the non-AP NLD may directly delete the asked link from the established links. In another embodiment of the invention, when the non-AP MLD may transmit the rejection response with the agree status to the AP MLD, the AP MLD may delete the asked link from the established links.

Figure 12:
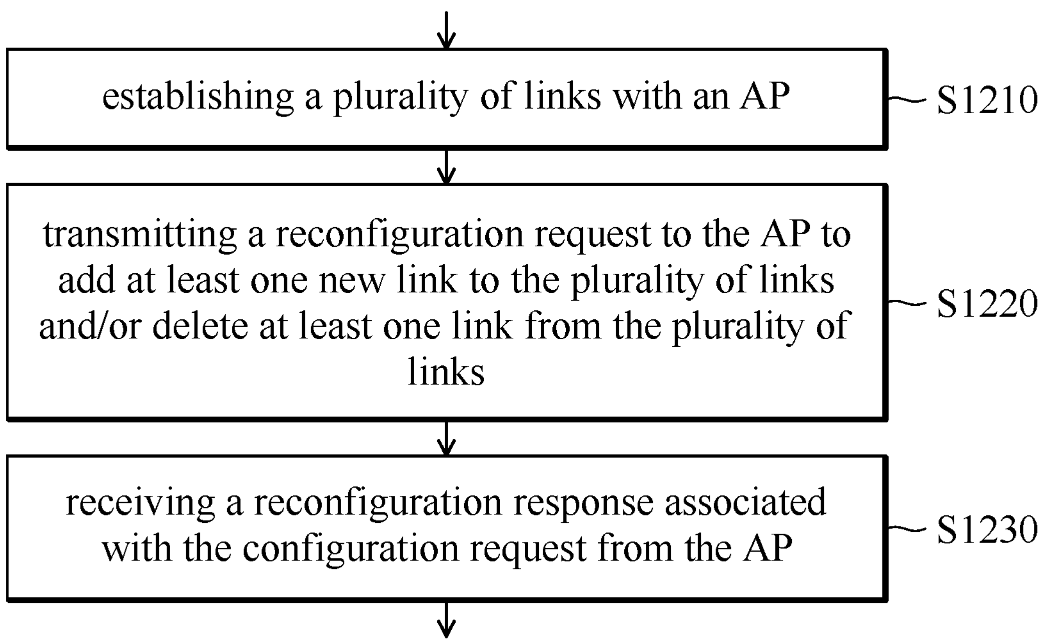
FIG. 12 is a flow chart illustrating a multi-link operation method according to an embodiment of the application.

FIG. 12 is a flow chart illustrating a multi-link operation method according to an embodiment of the application. The multi-link operation method can be applied to communication apparatus 120 of the wireless communication system 100. As shown in FIG. 12, in step S1210, the communication apparatus 120 may establish a plurality of links with an AP.

In step S1220, the communication apparatus 120 may transmit a reconfiguration request to the AP to add at least one new link to the plurality of links and/or delete at least one link from the plurality of links.

In step S1230, the communication apparatus 120 may receive a reconfiguration response associated with the reconfiguration request from the AP.

According to an embodiment of the invention, in the multi-link operation method, the reconfiguration request may comprise information about the at least one new link and information about the at least one link that needs to be deleted.

According to an embodiment of the invention, in the multi-link operation method, the reconfiguration response may indicate that the AP agrees to add the at least one new link to the plurality of links and/or delete the at least one link from the plurality of links. Alternatively, the reconfiguration response may indicate that the AP does not agree to add the at least one new link to the plurality of links and/or delete the at least one link from the plurality of links.

According to an embodiment of the invention, in the multi-link operation method, in response to the AP agreeing to add the at least one new link to the plurality of links, the reconfiguration response may further comprise key information for the at least one new link.

According to an embodiment of the invention, in the multi-link operation method, the communication apparatus 120 may receive an invitation frame from the AP, and transmit the reconfiguration request to the AP based on the invitation frame.

Figure 13:
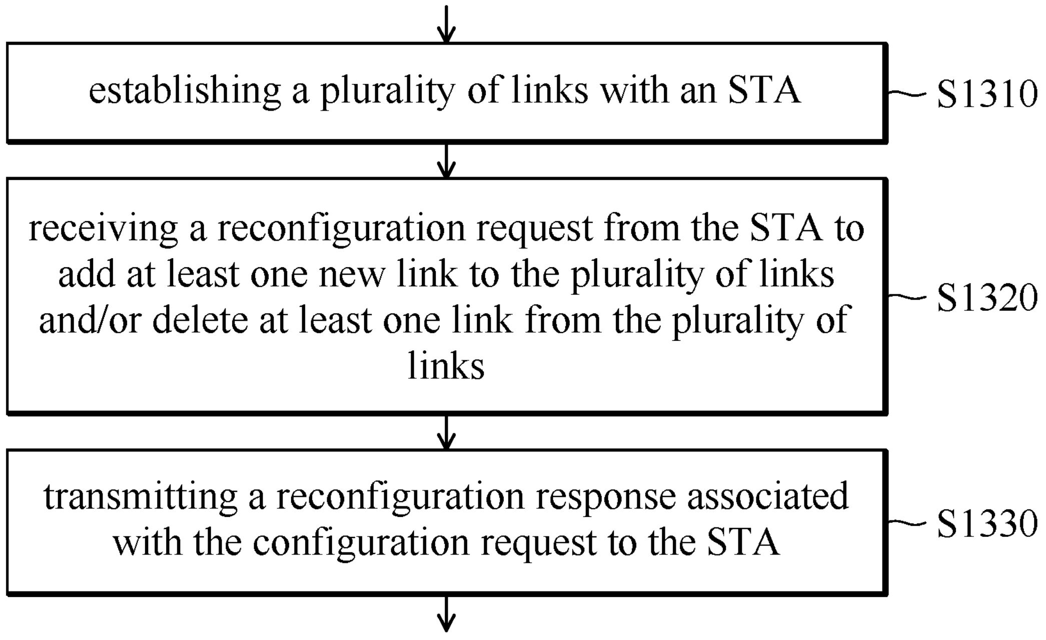
FIG. 13 is a flow chart illustrating a multi-link operation method according to another embodiment of the application.

FIG. 13 is a flow chart illustrating a multi-link operation method according to another embodiment of the application. The multi-link operation method can be applied to AP 110 of the wireless communication system 100. As shown in FIG. 13, in step S1310, the AP 110 may establish a plurality of links with a station (STA).

In step S1320, the AP 110 may receive a reconfiguration request from the STA to add at least one new link to the plurality of links and/or delete at least one link from the plurality of links.

In step S1330, the AP 110 may transmit a reconfiguration response associated with the reconfiguration request to the STA.

According to an embodiment of the invention, in the multi-link operation method, the reconfiguration request may comprise information about the at least one new link and information about the at least one link that needs to be deleted.

According to an embodiment of the invention, in the multi-link operation method, the reconfiguration response may indicate that the AP agrees to add the at least one new link to the plurality of links and/or delete the at least one link from the plurality of links. Alternatively, the reconfiguration response may indicate that the AP does not agree to add the at least one new link to the plurality of links and/or delete the at least one link from the plurality of links.

According to an embodiment of the invention, in the multi-link operation method, in response to the AP agreeing to add the at least one new link to the plurality of links, the reconfiguration response may further comprise key information for the at least one new link.

According to an embodiment of the invention, in the multi-link operation method, the AP 110 may further transmit an invitation frame to the STA, and receive the reconfiguration request based on the invitation frame from the STA.

According to an embodiment of the invention, in the multi-link operation method, the AP 110 may further determine whether any link of the plurality of links has low traffic or is in a power saving mode, and transmit the invitation frame to the STA in response to there being the at least one link having low traffic or being in a power saving mode to delete the at least one link with low traffic or in a power saving mode.

According to an embodiment of the invention, in the multi-link operation method, the AP 110 may further determine whether any link of the plurality of links has high traffic, and transmit the invitation frame to the STA in response to there being the at least one link having high traffic to add the at least one new link to the plurality of links.

In the multi-link operation methods provided in the invention, the non-AP MLD will be able to add or delete links between the AP-MLD and the non-AP MLD. In addition, the AP MLD may also suggest to the AP-MLD add or delete links between the AP-MLD and the non-AP ML based on the traffic of the links. Therefore, better bandwidth (spectrum) usage efficiency also can be achieved.

Use of ordinal terms such as “first”, “second”, “third”, etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a “processor”) such that the processor can read information (e.g., code) from and write information to the storage medium. A sample storage medium may be integral to the processor. The processor and the storage medium may reside in an ASIC. The ASIC may reside in the UE. In the alternative, the processor and the storage medium may reside as discrete components in the UE. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A multi-link operation method, comprising:

establishing, by a processor of an apparatus, a plurality of links with an access point (AP);

transmitting, by the processor, a reconfiguration request to the AP to add at least one new link to the plurality of links and/or delete at least one link from the plurality of links; and receiving, by the processor, a reconfiguration response associated with the reconfiguration request from the AP.

2. The multi-link operation method of claim 1, wherein the reconfiguration request comprises information about the at least one new link and information about the at least one link that needs to be deleted.

3. The multi-link operation method of claim 1, wherein the reconfiguration response indicates that the AP agrees to add the at least one new link to the plurality of links and/or delete the at least one link from the plurality of links, or does not agree to add the at least one new link to the plurality of links and/or delete the at least one link from the plurality of links.

4. The multi-link operation method of claim 3, wherein in response to the AP agreeing to add the at least one new link to the plurality of links, the reconfiguration response further comprises key information for the at least one new link.

5. The multi-link operation method of claim 1, further comprising:

receiving, by the processor, an invitation frame from the AP; and transmitting, by the processor, the reconfiguration request to the AP based on the invitation frame.

6. An apparatus for multi-link operation, comprising:

a transceiver, configured to perform wireless transmission and reception to and from an access point (AP);

a processor, coupled to the transceiver, and configured to:

establish a plurality of links with the AP;

transmit, via the transceiver, a reconfiguration request to the AP to add at least one new link to the plurality of links and/or delete at least one link from the plurality of links; and receive, via the transceiver, a reconfiguration response associated with the reconfiguration request from the AP.

7. The apparatus for multi-link operation of claim 6, wherein the reconfiguration request comprises information of the at least one new link and information of the at least one link that needs to be deleted.

8. The apparatus for multi-link operation of claim 6, wherein the reconfiguration response indicates that the AP agrees to add the at least one new link to the plurality of links and/or delete the at least one link from the plurality of links, or does not agree to add the at least one new link to the plurality of links and/or delete the at least one link from the plurality of links, wherein in response to the AP agreeing to add the at least one new link to the plurality of links, the reconfiguration response further comprises key information for the at least one new link.

9. The apparatus for multi-link operation of claim 6, wherein the processor is further configured to:

receive, via the transceiver, an invitation frame from the AP; and transmit, via the transceiver, the reconfiguration request to the AP based on the invitation frame.

10. A multi-link operation method, comprising:

establishing, by a processor of an access point (AP), a plurality of links with a station (STA);

receiving, by the processor, a reconfiguration request from the STA to add at least one new link to the plurality of links and/or delete at least one link from the plurality of links; and transmitting, by the processor, a reconfiguration response associated with the reconfiguration request to the STA.

11. The multi-link operation method of claim 10, wherein the reconfiguration request comprises information of the at least one new link and information of the at least one link that needs to be deleted.

12. The multi-link operation method of claim 10, wherein the reconfiguration response indicates that the AP agrees to add the at least one new link to the plurality of links and/or delete the at least one link from the plurality of links, or does not agree to add the at least one new link to the plurality of links and/or delete the at least one link from the plurality of links.

13. The multi-link operation method of claim 12, wherein in response to the AP agreeing to add the at least one new link to the plurality of links, the reconfiguration response further comprises key information for the at least one new link.

14. The multi-link operation method of claim 10, further comprising:

transmitting, by the processor, an invitation frame to the STA; and receiving, by the processor, the reconfiguration request based on the invitation frame from the STA.

15. The multi-link operation method of claim 14, further comprising:

determining, by the processor, whether any link in the plurality of links has low traffic or is in a power saving mode; and transmitting, by the processor, the invitation frame to the STA in response to there being the at least one link having low traffic or being in a power saving mode to delete the at least one link having low traffic or being in a power saving mode.

16. The multi-link operation method of claim 14, further comprising:

determining, by the processor, whether any link of the plurality of links has high traffic; and transmitting, by the processor, the invitation frame to the STA in response to there being the at least one link having high traffic to add the at least one new link to the plurality of links.

17. An access point (AP) for multi-link operation, comprising:

a transceiver, configured to perform wireless transmission and reception to and from a station (STA);

a processor, coupled to the transceiver, and configured to:

establish a plurality of links with the STA;

receive, via the transceiver, a reconfiguration request from the STA to add at least one new link to the plurality of links and/or delete at least one link from the plurality of links; and transmit, via the transceiver, a reconfiguration response associated with the reconfiguration request to the STA.

18. The AP for multi-link operation of claim 17, wherein the processor is further configured to:

transmit an invitation frame to the STA; and receive, via the transceiver, the reconfiguration request based on the invitation frame from the STA.

19. The AP for multi-link operation of claim 18, wherein the processor is further configured to:

determine whether any link of the plurality of links has low traffic or is in a power saving mode; and transmit, via the transceiver, the invitation frame to the STA in response to there being the at least one link having low traffic or being in a power saving mode to delete the at least one link having low traffic or being in a power saving mode.

20. The AP for multi-link operation of claim 18, wherein the processor is further configured to:

determine whether any link of the plurality of links has high traffic; and transmit, via the transceiver, the invitation frame to the STA in response to there being the at least one link having high traffic to add the at least one new link to the plurality of links.

* * * * *